United States Patent [19]
Kohno

[11] Patent Number: 5,652,922
[45] Date of Patent: Jul. 29, 1997

[54] ZOOM LENS MECHANISM

[75] Inventor: Hisanori Kohno, Izumiootsu, Japan

[73] Assignee: Minolta Camera Kabushiki Kaisha, Osaka, Japan

[21] Appl. No.: 274,442

[22] Filed: Jul. 13, 1994

[30] Foreign Application Priority Data

Jul. 15, 1993 [JP] Japan ................... 5-175138

[51] Int. Cl.$^6$ .................. G03B 17/00; G03B 17/04; G03B 5/02
[52] U.S. Cl. .................. 396/72; 396/348; 396/349
[58] Field of Search ............. 354/199, 195.12, 354/222; 359/701, 700, 694, 704; 396/72, 79, 85, 348, 349

[56] References Cited

U.S. PATENT DOCUMENTS

| | | | |
|---|---|---|---|
| 3,667,365 | 6/1972 | Fujimoto et al. | 95/44 R |
| 4,043,727 | 8/1977 | Henzl | 425/578 |
| 4,558,927 | 12/1985 | Omori et al. | 350/429 |
| 4,810,760 | 3/1989 | Strepparola et al. | 525/359 |
| 4,944,030 | 7/1990 | Haraguchi et al. | 354/403 |
| 5,136,337 | 8/1992 | Baruch | 355/290 |

FOREIGN PATENT DOCUMENTS

| | | |
|---|---|---|
| 0344806A2 | 12/1989 | European Pat. Off. . |
| 0344806A3 | 12/1989 | European Pat. Off. . |
| 0497383A2 | 8/1992 | European Pat. Off. . |
| 0497383A3 | 8/1992 | European Pat. Off. . |
| 2684773 | 6/1993 | France . |
| 4-52725 | 12/1992 | Japan . |

OTHER PUBLICATIONS

Technical Report on Olympus OZ 100 Zoom, pp. 58–67, *Photo Industry*, vol. 50, No. 5, May 1, 1992.

*Primary Examiner*—Safet Metjahic
*Assistant Examiner*—Christopher E. Mahoney
*Attorney, Agent, or Firm*—Burns, Doane, Swecker & Mathis, LLP

[57] ABSTRACT

A stationary barrel attached to a camera body, a first movable barrel, a second movable barrel and a third movable barrel are moved out successively. A first lens frame holding a first lens unit is held in the third barrel to be movable along the optical axis, and a second lens frame holding a second lens unit is held in the second barrel to be movable along the optical axis. With this arrangement, the three movable barrels are all housed in the stationary barrel, and the total moving-out mount of the three movable barrels is remarkably large compared to conventional arrangements.

14 Claims, 16 Drawing Sheets

ZOOM LENS MECHANISM

BACKGROUND OF THE INVENTION

1. Field of the Invention

The present invention relates to a zoom lens mechanism for use in a camera, and more particularly, to a zoom lens mechanism incorporated in a so-called lens shutter zoom camera.

2. Description of the Prior Art

Lens shutter cameras are widespread among the general public because of their compactness and handiness. In recent years, a demand for lens shutter cameras having higher functions has been increasing, which has led to the development of a lens shutter camera of a type provided with a zoom lens mechanism.

Generally, a zoom lens mechanism includes a stationary barrel fixed to the camera body, and a single or two movable barrels fitted inside the stationary barrel. In the stationary or the movable lens barrel, a first lens unit and a second lens unit constituting a taking optical system are movably incorporated through a lens driving mechanism using a cam. The focal length is varied between the shortest and the longest focal length conditions by increasing or decreasing the movement amount of the movable barrel, and at least one of the first and the second lens units is moved to change the relative distance between the lens units, thereby performing focusing.

As lens shutter cameras in which such a zoom lens mechanism is incorporated, the following have already been put into practice use: a zoom camera of a two-barrel type having two barrels including one movable barrel where a single movable barrel is fitted inside a stationary barrel fixed to the camera body; and a zoom camera of a three-barrel type having three barrels including two movable barrels where two movable barrels are fitted inside a stationary barrel so as to be successively movable out.

The lens driving mechanism of the former camera is structured such that the first lens unit is driven by a lead to move straight and the second lens unit is moved out in accordance with the movement of the first lens unit by a differential motion of the first lens unit and the stationary barrel. The lens driving mechanism of the latter camera has two moving-out mechanisms for lens units. The first moving-out mechanism employs a mechanism to move out all the lens units by using cams, and the second moving-out mechanism employs a mechanism to move out the lens units by using a bottomed cam. The bottomed cam is provided with cam grooves for each of the first, the second and the third lens units.

In either of these conventional structures, however, it is extremely difficult to realize both a compactness and a high zoom ratio. Specifically, since the moving-out amount of the movable barrel should be large to increase the zoom ratio, the dimension of one movable barrel along the optical axis should be large in the three barrel structure like the latter one, not to mention in the two barrel structure like the former one.

For this reason, when a zoom lens mechanism having a high zoom ratio is mounted on a camera, it is difficult to contain within the thickness of the camera the stationary barrel into which the movable barrels are retreated. Even if a perfect collapsible camera could be realized, since the camera should be of great bulk with a great thickness, it would be impossible to realize compactness. Therefore, the size reduction of the cameras embodying the above-described conventional structures is made by restraining the zoom ratio to be low. Thus, according to the conventional structures, zoom mechanisms are realized which are functionally unsatisfactory compared to zoom lens mechanisms mounted on single-lens reflex cameras.

SUMMARY OF THE INVENTION

An object of the present invention is to provide a zoom lens mechanism realizing a high zoom ratio and compactness while being collapsible by providing three movable barrels attached, so as to be movable out, to a stationary barrel fixed inside the camera body and by holding a first and a second lens units in the movable barrels so as to be movable out.

To achieve the above-mentioned object, a zoom lens mechanism of the present invention is provided with a stationary barrel fixed to a camera, a first movable barrel held in the stationary barrel to be movable out from the stationary barrel, a second movable barrel held in the first movable barrel to be movable out from the first movable barrel, a third movable barrel held in the second movable barrel to be movable out from the second movable barrel, a first lens unit held in the third movable barrel to be movable in the third movable barrel, and a second lens unit held in at least one of the first and second movable barrels to be movable therein.

According to such a feature, when the zoom lens mechanism is used, the three movable barrels are moved out from the stationary barrel, and focusing is performed by moving the first and second lens units in the movable barrels holding them in accordance with the variation in focal length. In such an arrangement, even if the length of each of the movable barrels is set so that all of the three movable barrels are housed in the stationary barrel, the total moving-out amount of the three movable barrels is remarkably large compared to conventional arrangements. As a result, a high zoom ratio is obtained.

Further, when a collapsible structure is employed, the necessary thickness of the camera is much smaller. As a result, a zoom lens mechanism is realized which has a high zoom ratio but is very compact and can be incorporated in a lens shutter camera.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
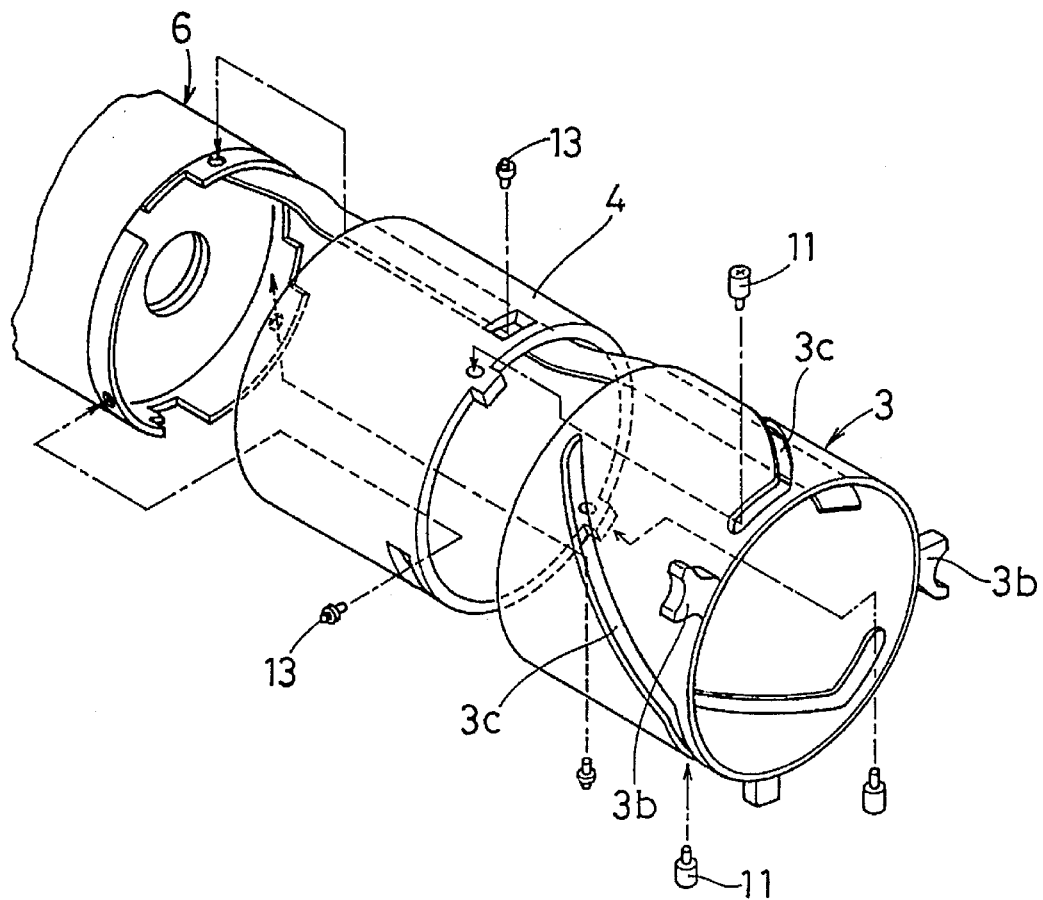
FIG. 1 is an exploded perspective view showing the front half of a zoom mechanism according to an embodiment of the present invention.
Figure 2:
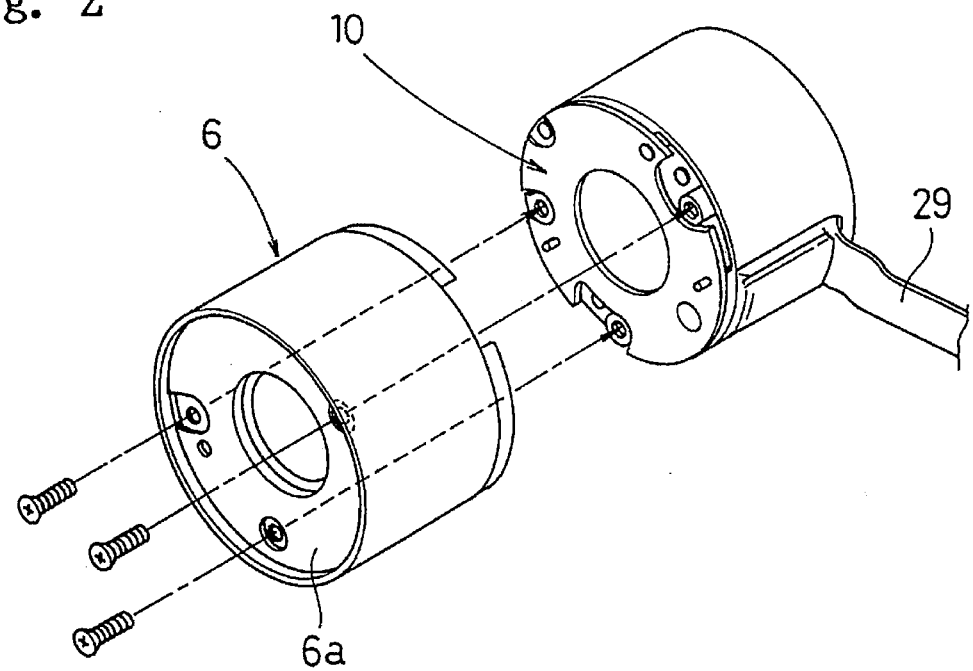
FIG. 2 is an exploded perspective view showing the front half of the zoom mechanism viewed from the opposite side of FIG. 1.
Figure 3:
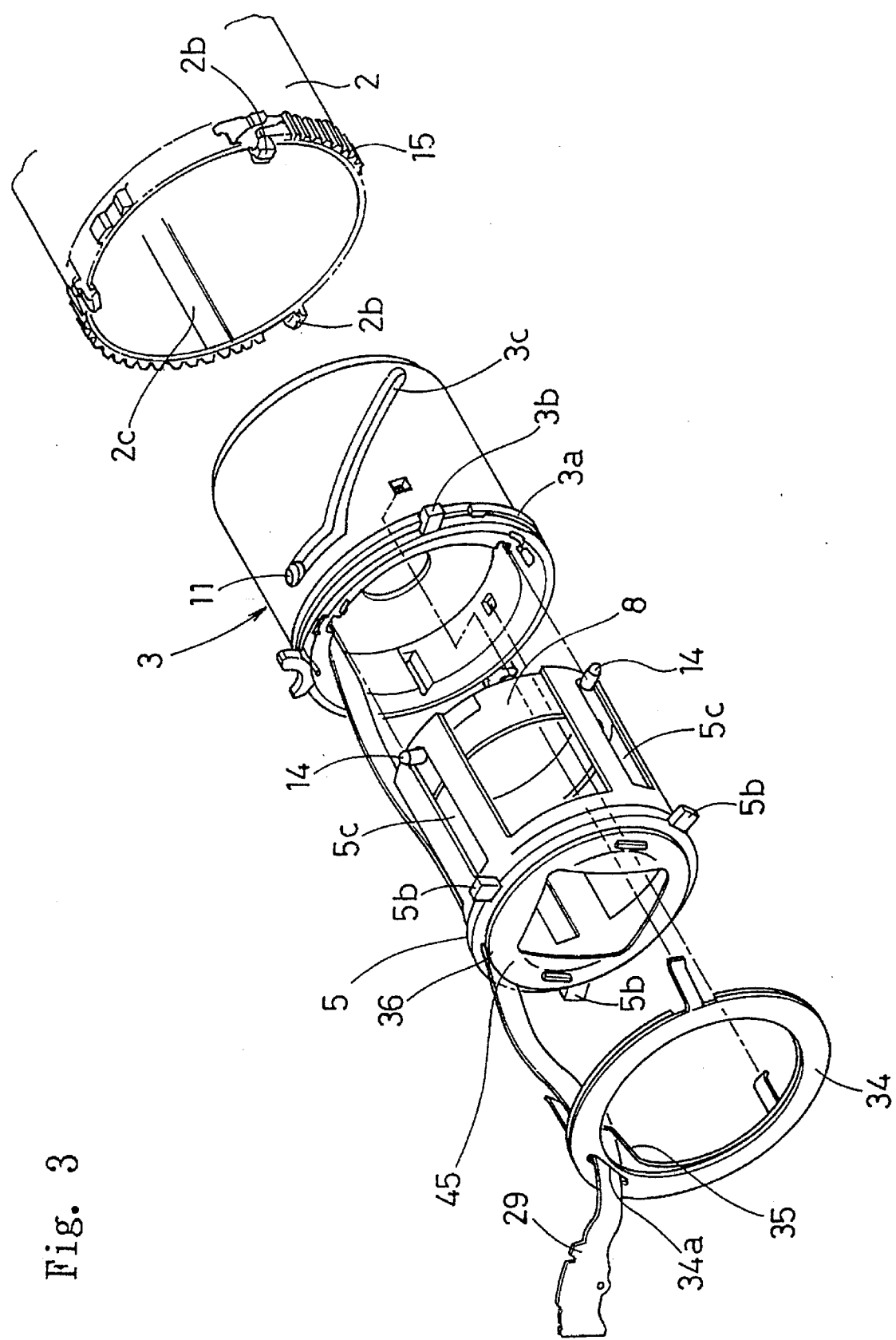
FIG. 3 is an exploded perspective view showing the rear half of the zoom mechanism.
Figure 4:
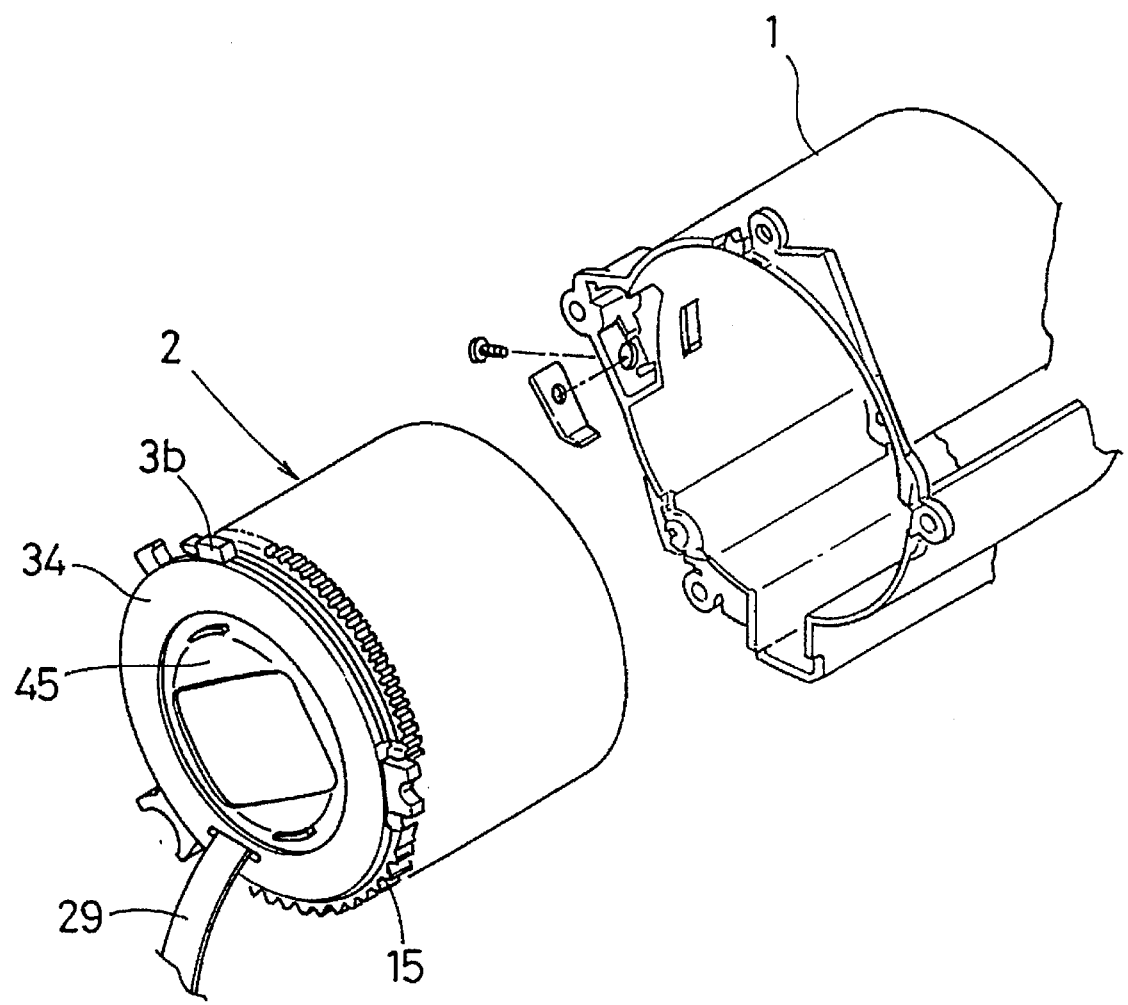
FIG. 4 is an exploded perspective view showing the rear half of the zoom mechanism which is partially assembled.
Figure 5:
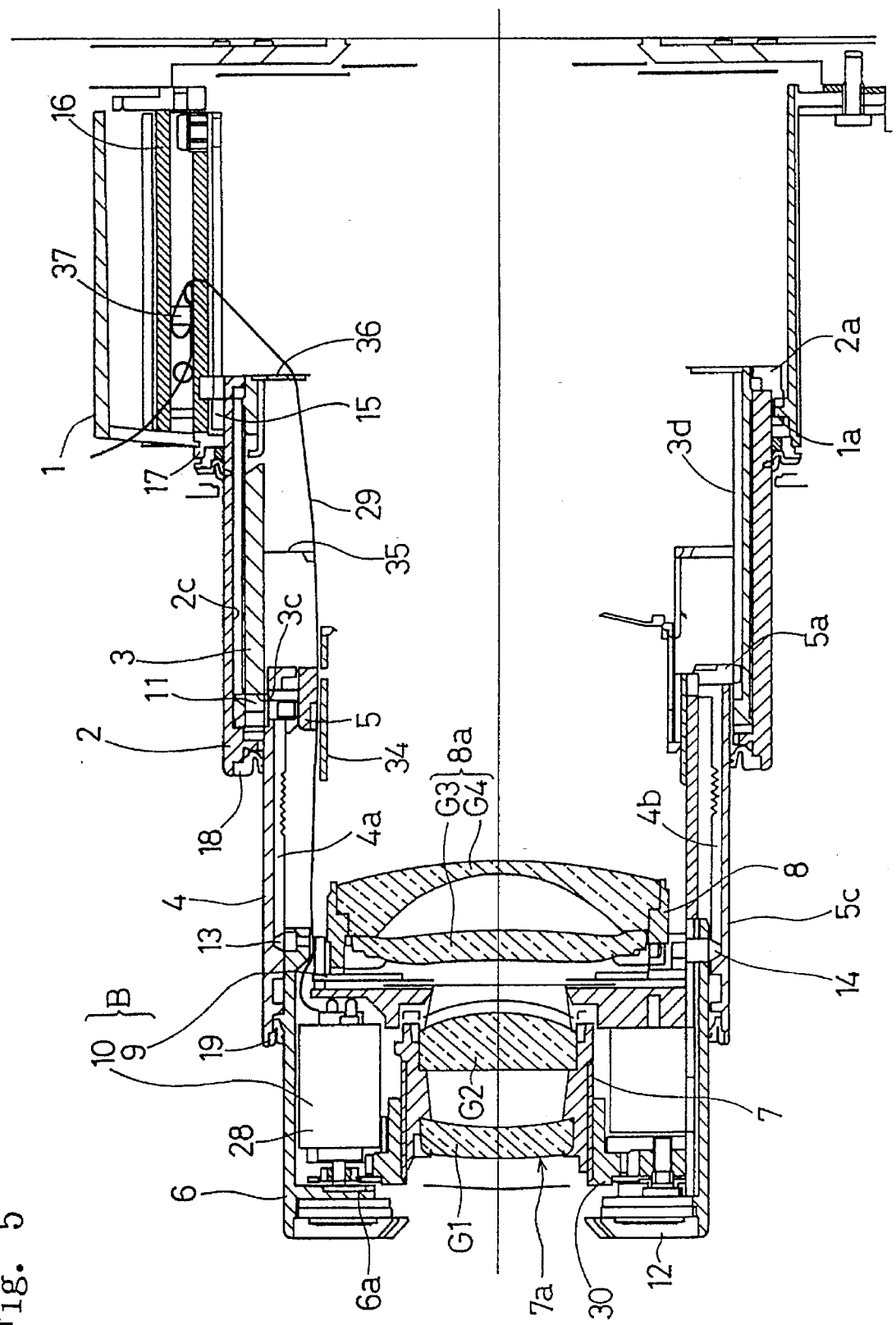
FIG. 5 is a longitudinal side view showing a longest focal length condition of the zoom lens mechanism.
Figure 6:
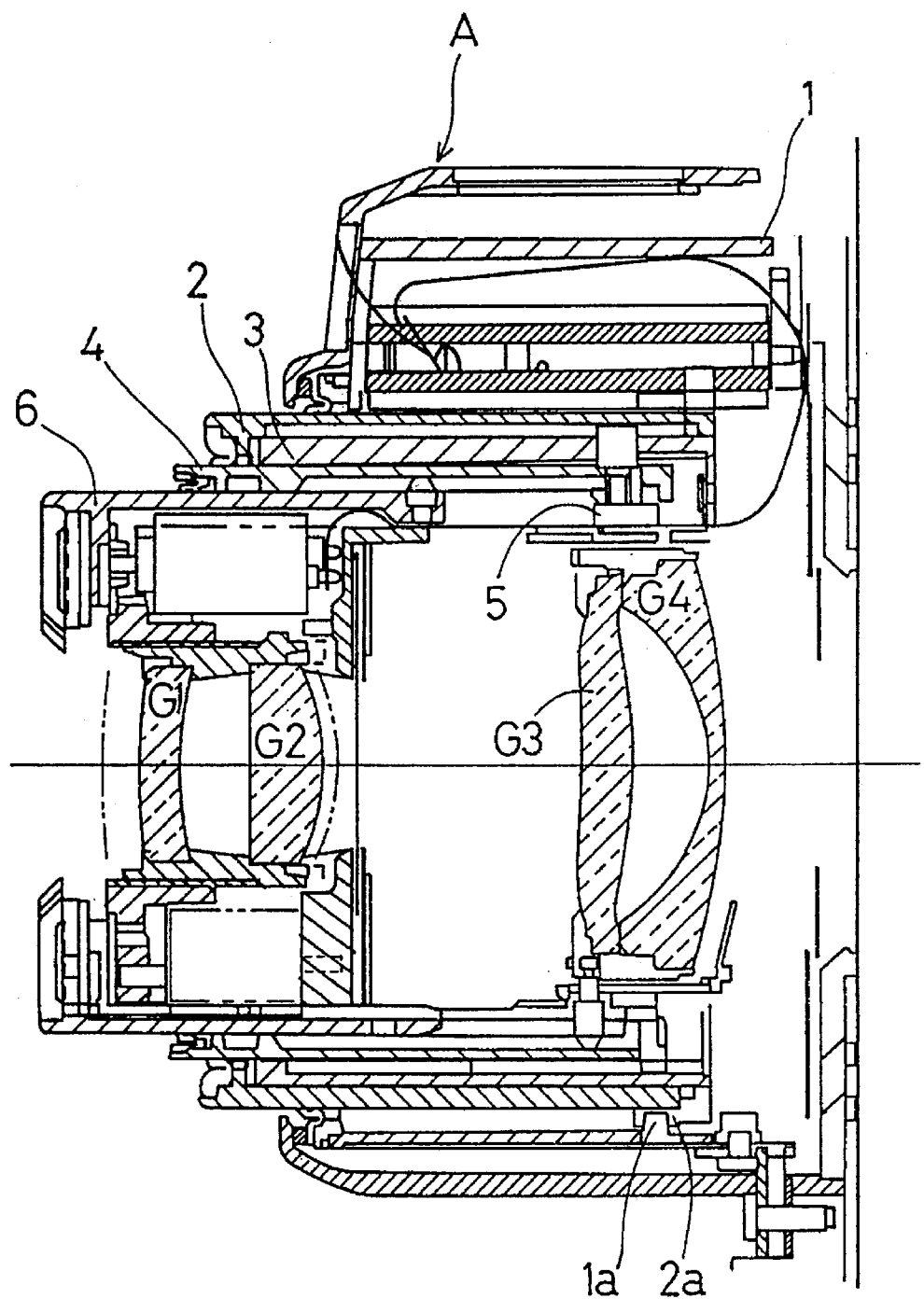
FIG. 6 is a longitudinal side view showing a shortest focal length condition of the zoom lens mechanism.
Figure 7:
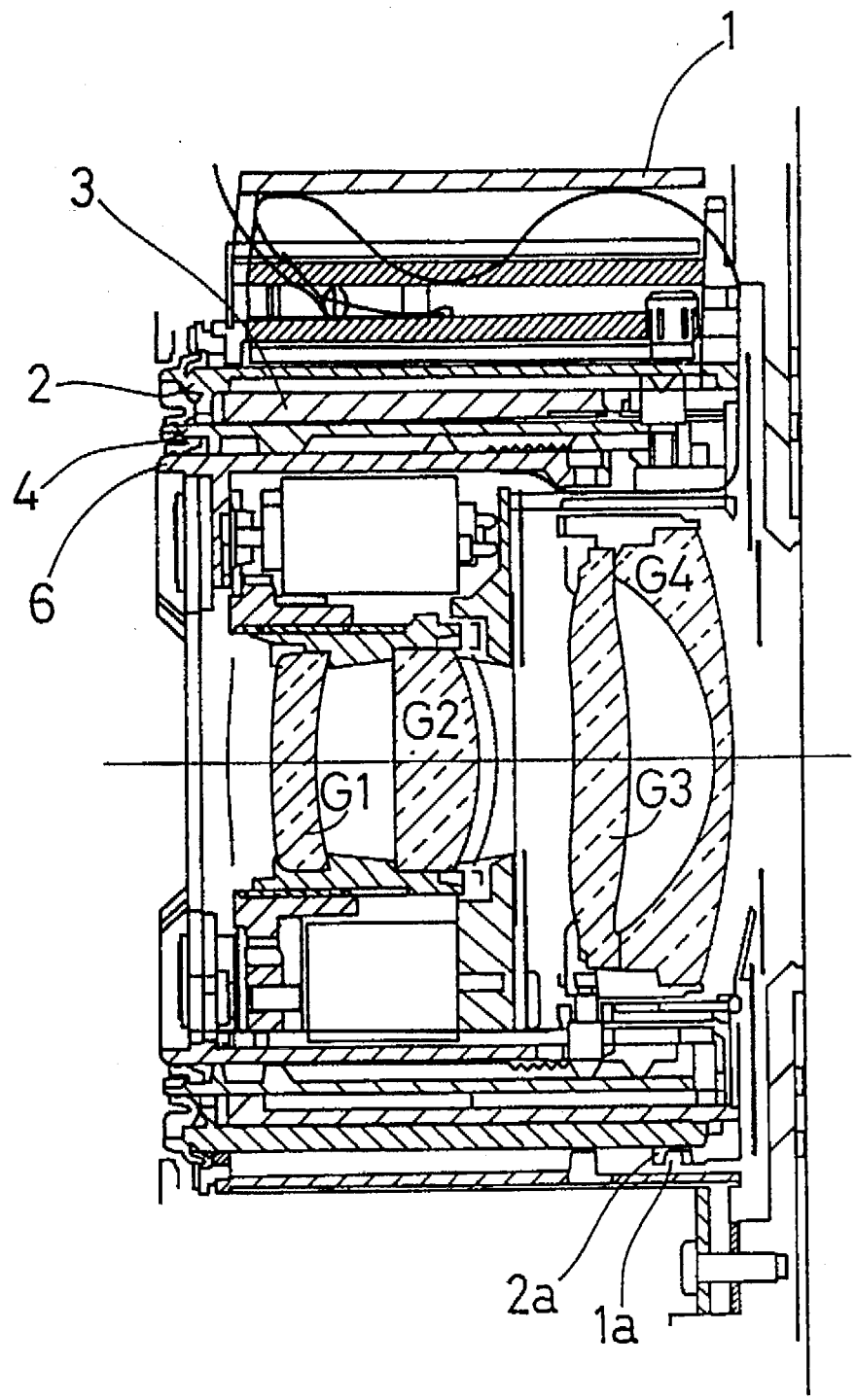
FIG. 7 is a longitudinal side view showing a collapsed condition of the zoom lens mechanism.
Figure 8:
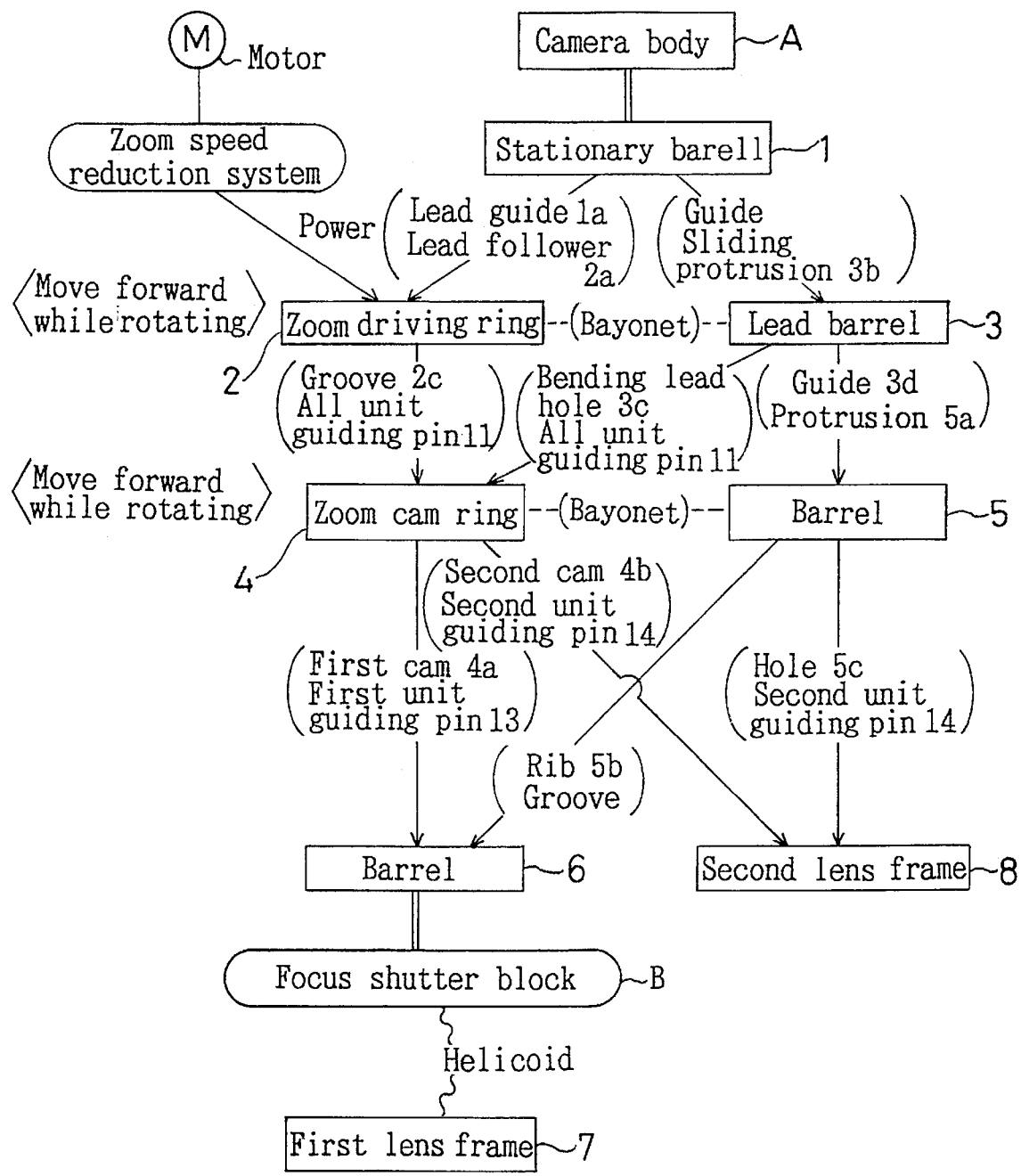
FIG. 8 is a block diagram showing a relationship among the functions of members constituting a zoom driving system.

Hereinafter, an embodiment of the present invention will be described in detail with reference to the drawings. FIG. 1 is a partially exploded view showing the front half of a zoom moving-out mechanism according to the embodiment of the present invention. FIG. 2 is a partially exploded view showing the front half of the mechanism viewed from the opposite side of FIG. 1. FIG. 3 is an exploded view of the rear half of the zoom moving-out mechanism. FIG. 4 shows a partially assembled condition of the rear half of the mechanism. FIGS. 5, 6 and 7 are cross-sectional views showing a longest focal length condition, a shortest focal length condition and a collapsed condition of the embodiment of the present invention, respectively. FIG. 8 shows a relationship among the functions of members constituting the zoom moving-out mechanism.

The zoom lens mechanism shown in these figures is to be incorporated in a lens shutter camera and includes a stationary barrel 1 constituting a first barrel unit, a zoom driving ring 2 constituting a second barrel unit which is movable out from the stationary barrel 1, a lead barrel 3 which is a first movable barrel, a zoom cam ring 4 constituting a third barrel unit which is movable out from the zoom driving ring 2, a barrel 5 which is a second movable barrel, and a barrel 6 constituting a fourth barrel unit which is movable out from the zoom cam ring 4. The three barrel units (second to fourth barrel units) are moved out from the stationary barrel 1 constituting the first barrel unit.

Reference numeral 7 represents a first lens frame for holding a first lens unit 7a including two lens elements G1 and G2. Reference numeral 8 represents a second lens frame for holding a second lens unit 8a including two lens elements G3 and G4. The first lens frame 7 is attached inside the barrel 6, while the second lens frame 8 is movably attached inside the barrel 5. A shutter unit 9 and a focusing unit 10 which constitute a block B are fixed inside the barrel 6 together with the first lens frame 7.

Referring to FIGS. 4 and 5, the stationary barrel 1 is fixed inside a camera body A. The zoom driving ring 2 is rotatably attached inside the stationary barrel 1. The lead barrel 3 is held to be movable along the optical axis. Specifically, a lead follower 2a is formed on the periphery of the rear end of the zoom driving ring 2. The lead follower 2a engages with a spiral lead guide 1a formed on the inner surface of the stationary barrel 1. The lead follower 2a slidingly moves along the lead guide 1a to move the zoom driving ring 2 while rotating.

Referring to FIGS. 3 and 5, the lead barrel 3 is fitted in the zoom driving ring 2. On the periphery of the rear end thereof, a flange 3a is formed to protrude along the diameter. The flange 3a is bayonet-connected with a claw 2b formed at the rear end of the zoom driving ring 2, so that the lead barrel 3 is rotatably fitted in the zoom driving ring 2 while being prevented from falling off.

Under this engagement condition, a sliding protrusion 3b formed on the periphery of the rear end of the lead barrel 3 engages with a guide member (not shown) formed on the inner surface of the stationary barrel 1, so that the lead barrel 3 moves straight along the optical axis at an equal speed to that of the zoom driving ring 2 while its rotation is inhibited by the stationary barrel 1.

Referring to FIGS. 1 and 3, a bending lead hole 3c is formed in the side wall of the lead barrel 3, and a groove 2c is formed in the inner surface of the zoom driving ring 2. The zoom cam ring 4 is fitted in the lead barrel 3. Under this condition, an all unit guiding pin 11 screwed in the periphery of the zoom cam ring 4 slidably engages with the groove 2c of the zoom driving ring 2 through the bending lead hole 3c of the lead barrel 3, so that the zoom cam ring 4 is moved along the optical axis while being rotated as the all unit guiding pin 11 moves along the groove 2c and the bending lead 3c.

Referring to FIGS. 3 and 5, the barrel 5 is fitted in the zoom cam ring 4 while being bayonet-connected therewith. While the bayonet-connected portion is not shown, the structure thereof is similar to that of the connection between the lead barrel 3 and zoom driving ring 2. A protrusion 5a is formed at the rear end of the barrel 5. The protrusion 5a engages with a guide 3d formed at the inner surface of the lead barrel 3, so that the barrel 5 moves straight along the optical axis at an equal speed to that of the zoom cam ring 4 while its rotation is inhibited by the lead barrel 3.

Referring to FIGS. 2 and 5, the lead barrel 6 integrally hold the shutter unit 9 and the focus unit 10 with a flange 6a formed on the inner surface of the front end thereof. Reference numeral 12 represents a barrier unit provided at the front surface side of the flange 6a. The barrier unit 12 opens and closes in response to the zoom driving system when the zoom lens mechanism is collapsed, and protects the front lens element G1 of the first lens unit 7a when the zoom lens mechanism is not used.

Figure 16:
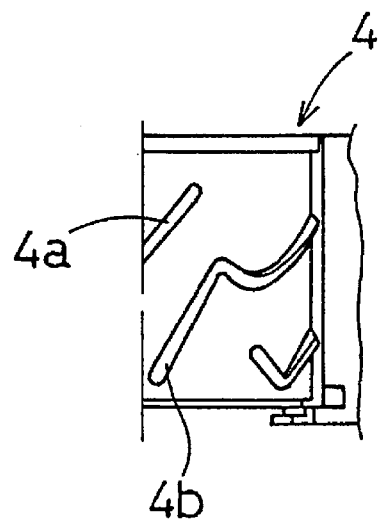
FIG. 16 is a sectional view showing bottomed cams.
Figure 17:
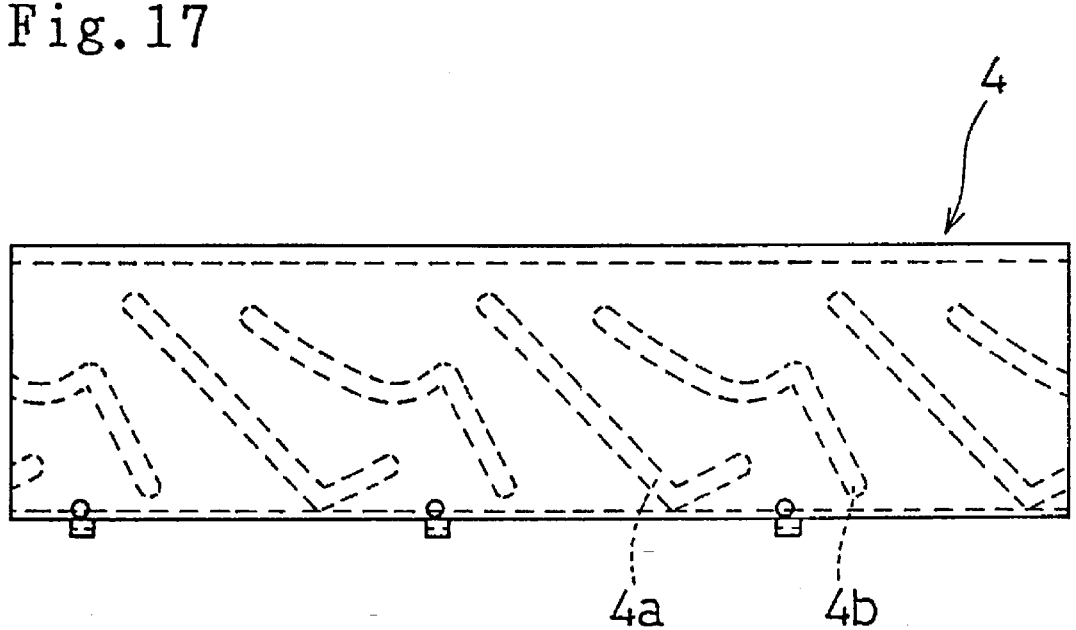
FIG. 17 is a development view showing the bottomed cams.

Referring to FIGS. 16 and 17, on the entire inner surface of the zoom cam ring 4, first cams 4a and second cams 4b are alternately arranged to divide the inner surface into six equal zones. The structures of the cams 4a and 4b will be described later.

Referring to FIGS. 3 and 5, first unit guiding pins 13 are pressed into the periphery of the rear end of the barrel 6. The first unit guiding pins 13 engage with the first cams 4a formed on the inner surface of the zoom cam ring 4. In the inner surface of the barrel 6, a groove (not shown) is formed. The groove engages with a rib 5b formed on the periphery of the front end of the barrel 5. With this engagement, the rotation of the non-illustrated groove is regulated by the rib 5b and the first unit guiding pins 13 move along the first cams 4a, so that the barrel 6 moves straight along the optical axis.

The second lens frame 8 is fitted in the barrel 5 while being held thereby to be movable along the optical axis. Specifically, second unit guiding pins 14 are formed to protrude from the periphery of the second lens frame 8. The second unit guiding pins 14 engage with the second cams 4b of the zoom cam ring 4 through a long and narrow hole 5c formed in the barrel 5, so that the second lens frame 8 is moved straight along the optical axis as the second unit guiding pins 14 moves along the hole 5c and the second cam 4b. The structure of attachment of the second lens frame 8 to the barrel 5 will be described later in detail.

To the periphery of the rear end of the zoom driving ring 2, a large-diameter driving gear 15 is attached. The driving gear 15 engages with a small-diameter zoom driving gear 16 located at the end of a zoom speed reduction system and transmits a driving force of a zoom motor (not shown) provided in the camera body A to the zoom moving-out mechanism through the zoom driving system. The zoom driving gear 16 is formed to be longer along the axis so as to always engage with the driving gear 15 moved backward and forward by the movement of the zoom driving ring 2. The structure of the zoom driving gear 16 will be described later in detail.

Subsequently, an operation of the zoom moving-out mechanism having the above-described four-barrel-unit structure having three movable barrel units will be described with reference to FIG. 8. First, the driving force of the zoom motor is transmitted from the zoom driving system to the zoom driving ring 2 through the zoom driving gear 16 located at the end of the zoom driving system and the large-diameter driving gear 15. Receiving the driving force, the lead follower 2a is guided along the lead 1a of the stationary barrel 1, so that the zoom driving ring 2 is moved out along the optical axis while rotating along the spiral path of the lead guide 1a. The driving gear 15 of the zoom driving ring 2 and the tooth-shaped surface of the zoom driving gear 16 transmit the driving force while sliding along the optical axis.

By the forward movement of the zoom driving ring 2, the lead barrel 3 is moved straight along the optical axis at an equal speed to that of the zoom driving ring 2 while its rotation is inhibited by the stationary barrel 1. The zoom cam ring 4 is moved forward along the optical axis while being rotated as the all unit guiding pin 11 moves along the groove 2c of the zoom driving ring 2 and the bending lead hole 3c of the lead barrel 3. The barrel 5 moves straight along the optical axis at an equal speed to that of the lead barrel 3 while its rotation is inhibited by the lead barrel 3.

The zoom cam ring 4 moves while rotating and the barrel 5 moves straight, thereby driving the focus shutter block B and the second lens frame 8 holding the second lens unit 8a. In this case, since the first cams 4a for moving the focus shutter block B and the second cams 4b for moving the second lens frame 8 are integrally formed on the inner surface of the zoom cam ring 4, the drive transmitting system branches at the zoom cam ring 4 to the focus shutter block B and to the second lens frame 8.

The focus shutter block B operating integrally with the barrel 6 moves forward as the barrel 6 moves, by receiving the driving force of the zoom cam ring 4, along the optical axis while its rotation is inhibited by the barrel 5. The second lens frame 8 is moved straight along the optical axis as the second unit guiding pin 14 moves along the hole 5c and the second cam 4b. When zooming is performed in this manner, by driving the lens barrel from a shorter focal length condition to a longer focal length condition, the first lens unit 7a and the second lens unit 8a move forward while varying the distance therebetween.

In the zoom lens mechanism according to this embodiment having the basic structure described above, the zoom ratio is approximately 2.9:1 in the longest focal length condition shown in FIG. 5 where all the barrel units are moved out and in the shortest focal length condition shown in FIG. 6 where the barrels are moved out by a minimum amount for photographing. On the contrary, in conventional arrangements, the zoom ratio is approximately 2:1 at the most. Thus, in the arrangement according to this embodiment, the zoom ratio is remarkably high compared to conventional arrangements.

As shown in FIG. 7, in order that the total length of the zoom lens mechanism is smaller than that at the shortest focal length condition when the zoom lens mechanism is not used, all the barrel units are collapsed and housed in the stationary barrel 1 incorporated in the camera body A. Reference designation 1c represents a collapsed end stopper provided at the rear end of the stationary barrel.

In the four-barrel-unit, three-movable-barrel-unit zoom lens mechanism as described above, each barrel unit should carefully be structured because of the greater number of barrel units. Hereinafter, structures of this embodiment which are largely different from those of conventional arrangements will be described.

Figure 15:
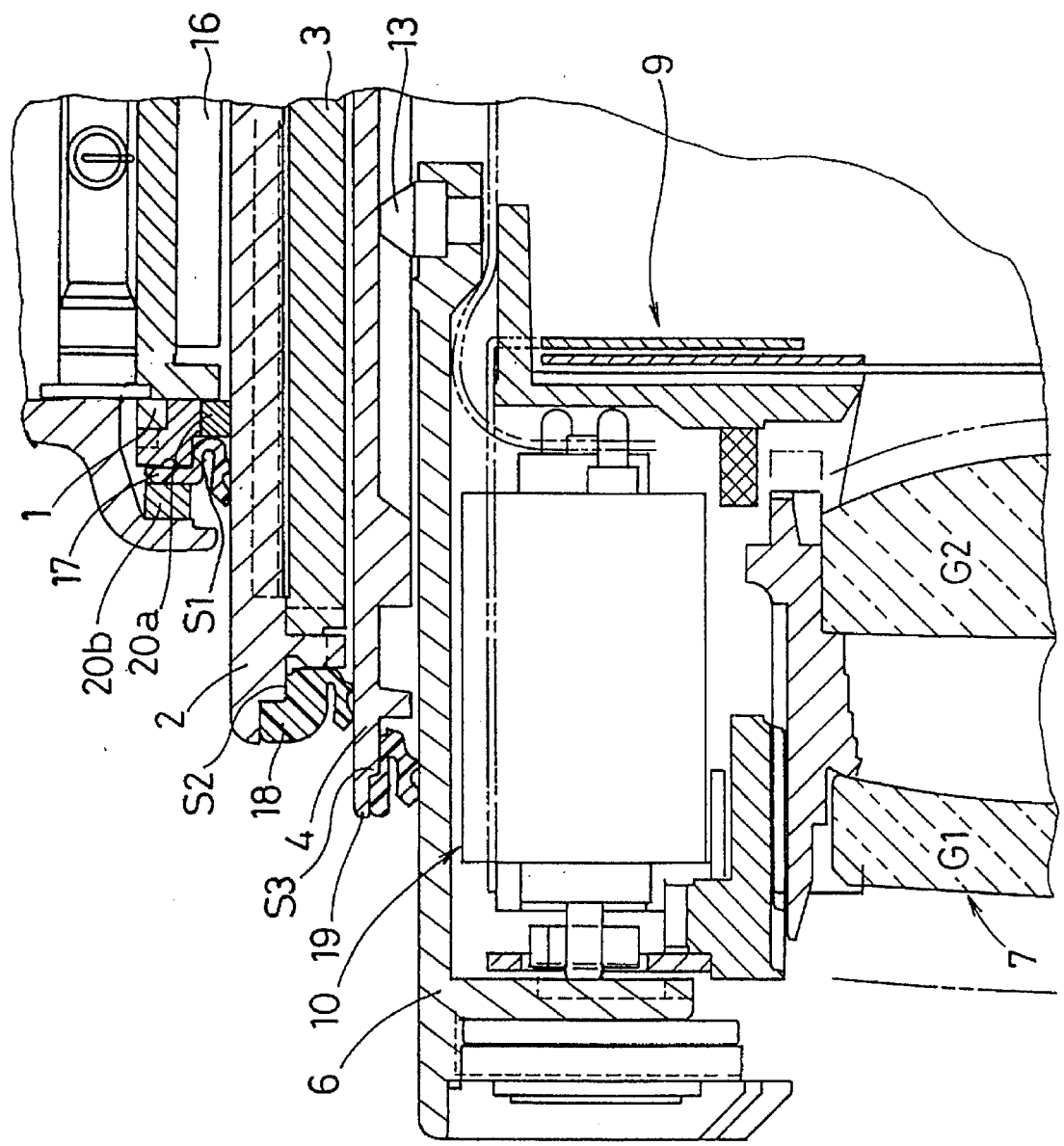
FIG. 15 is an enlarged cross-sectional view showing the position where a light intercepting ring is arranged, and the structure of the light intercepting ring.

Referring to FIG. 15, there is shown the arrangement and structure of a light intercepting rubber ring. In zoom lens mechanisms, it is necessary to arrange light intercepting members at the front ends of the barrels constituting the lens barrel. In this embodiment, since a greater number of barrel units is provided to realize a compact zoom moving-out mechanism, the spaces are largely restricted for arranging light intercepting ring 17, 18 and 19 to be arranged at the front ends of the barrels, i.e. the stationary barrel 1, the zoom driving ring 2, the zoom cam ring 4 and the barrel 6, respectively.

Therefore, in this embodiment, it is difficult to use for the light intercepting rings conventional materials such as a silk fiber to which surface a rubber coat is applied or a Teflon (trademark)-made sheet, since they cannot be arranged in the restricted spaces. For this reason, the light intercepting rings 17 to 19 of the present invention are rubber parts formed by compression-molding a silicone rubber material rich in elasticity and moldability. The excellent elasticity of the rubber effectively restrains the decentering of each barrel.

To achieve their main object, light interception, the light intercepting rings 17 to 19 are made of a black rubber material, which is formed into a lip shape having a configuration and dimensions fitted for the space in which it is arranged, thereby absorbing to the utmost the nonuniformity of dimensions among the stationary barrel 1, the zoom driving ring 2, the zoom cam ring 4 and the barrel 6 and preventing the leakage of light due to the existence of extraneous substances.

The accuracy of attachment position is improved by forming a step portion on each of the light intercepting rings 17, 18 and 19 and each of the stationary barrel 1, the zoom driving ring 2, the zoom cam ring 4 and the barrel 6 to which the rings 17, 18 and 19 are set. In FIG. 15, reference designations S1, S2 and S3 represent the step portions.

More specifically, the light intercepting arrangement for a space between the stationary barrel 1 and the zoom driving ring 2 is as follows: The peripheral surface of the intercepting ring 17 including the step portion S1 is fixed by a silicone bond to a ring member 20a attached to an end of the periphery of the stationary barrel 1, the outer surface of a strip portion of the light intercepting ring 17 is held by being pressed by a plane ring member 20b attached to the inner side surface of an aperture flange Aa of the camera body A, and the inner surface of the light intercepting ring 17 is pressed against the periphery of the zoom driving ring 2.

The light intercepting arrangement for a space between the zoom driving ring 2 and the zoom cam ring 4 is as follows: The peripheral surface of the light intercepting ring 18 including the step portion S2 is fixed to the zoom driving ring 2 by a silicone bond, thereby fixing the light intercepting ring 18 to the driving ring 2. The inner surface of the light intercepting ring 18 is pressed against the periphery of the zoom cam ring 4.

The light intercepting arrangement for a space between the zoom cam ring 4 and the barrel 6 is as follows: The peripheral surface of the light intercepting ring 19 including the step portion S3 is fixed to the zoom cam ring 4 by a silicone bond, thereby fixing the light intercepting ring 19 to the cam ring 4. The inner surface of the light intercepting ring 18 is pressed against the periphery of the barrel 6. Since the light intercepting rings 17 to 19 are of flange configurations having the step portions S1 to S3, respectively, the positional accuracy at the time of attachment is guaranteed, and the assembling capability is improved.

In addition, since the zoom movement amount is large, the pressure angles of the first and second cams 4a and 4b are high, so that it is inevitable that the zoom torque is mechanically high as shown in FIGS. 16 and 17. For this reason, if the sliding resistances of the light intercepting rings 17 to 19 are great, the time required for zoom driving and the driving noise caused by zooming increases. To prevent this, a special coat of fluorine is applied to the sliding surfaces of the rubber made rings 17 to 19 and the barrels.

Figures 10A, 10B:
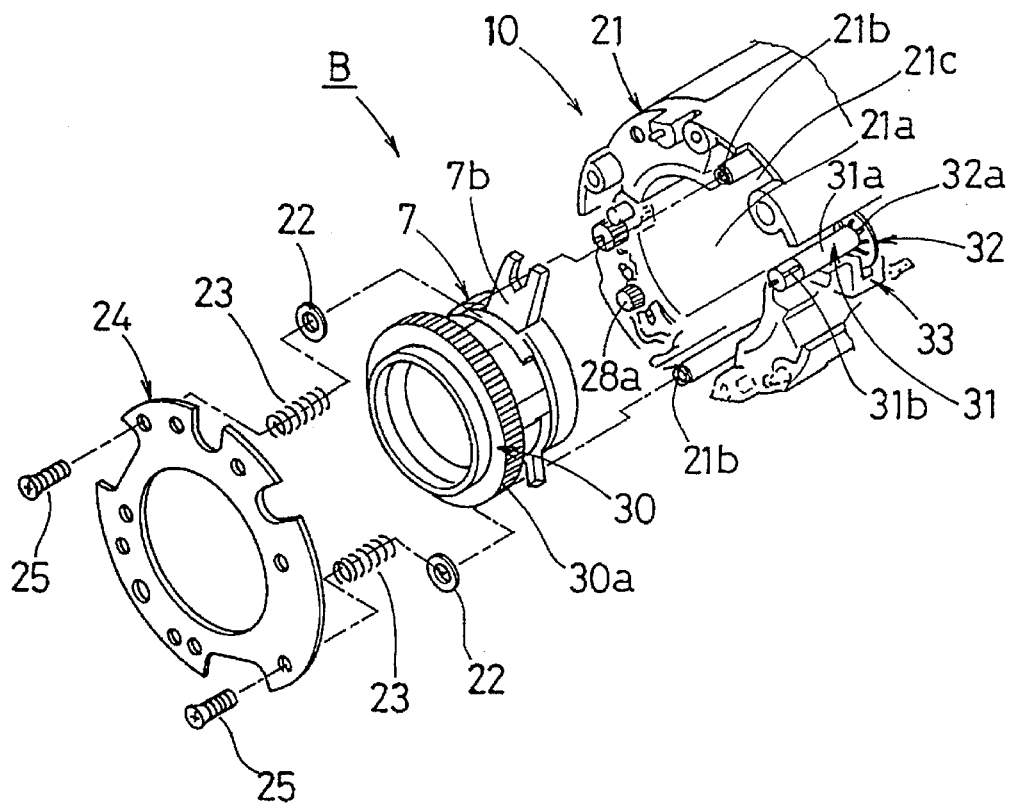
FIG. 10A is an exploded perspective view of a focus shutter block.
FIG. 10B is an exploded perspective view of the focus shutter block viewed from a different direction from FIG. 10A.

FIGS. 10A and 10B are exploded views of the focus shutter block B. The focus shutter block B includes the shutter unit 9 and the focus unit 10 integrally formed at the front surface side of the unit 9, and is provided in the barrel 6.

Referring to FIG. 10A, the focus unit 10 is assembled in the following manner: The first lens frame 7 is fitted in the center of a focus base member 21, and a washer 22 and a compression spring 23 are fitted around a cylindrical boss 21b formed on the focus base member 21. Then, a helicoid presser plate 24 of ring form is set at the front surface of the focus base member 24, and the presser plate 24 is screwed to the focus base member 21 by a screw 25.

Referring to FIG. 10B, the shutter unit 9 is fixed to the focus unit 10 by setting a shutter base member 26 at the rear surface side of the focus base member 21 and by driving a screw from the front surface side of the focus base member 21 through a cylindrical boss 26a formed to protrude from the shutter base member 26.

The shutter base member 26 is provided with an AF motor 28 for driving an automatic focusing mechanism. The AF motor 28 is connected through a flexible printed circuit lead 29 to a driving circuit (not shown) provided in the camera body A. An output gear axis 28a of the AF motor 28 faces the front surface of the focus base member 21.

The first lens frame 7 is provided with an engagement member 7b protruding from the periphery of the frame 7. The engagement member 7b engages with a guide 21c provided at the focus base member 21. Between the first lens frame 7 and the focus base member 21, a helicoid (not shown) is provided on the inner diameter side and a female helicoid 30 having a gear 30a is provided on the outer diameter side. They are fixed to the focus base member 21 along the optical axis. The helicoid of the female helicoid 30 is linked with a helicoid (not shown) provided on the outer diameter side of the first lens frame 7. Reference designation 21d represents a focus light intercepting member provided at the focus base member 21.

Since the helicoid for focusing is pushed against the helicoid of the female helicoid 30 in one direction by the compression spring 23, the influence of the backlash caused at the linked portion of the helicoids is removed, so that the focusing accuracy increases. Since the first lens unit 7a is moved straight, the optical performance is not largely varied due to the moving out for focusing.

In this arrangement, the AF motor 28 is rotated by the electric power supplied from the driving circuit through the flexible lead 29. This driving of the AF motor 28 rotates the female helicoid 30 through a speed reduction gear chain including the gear axis 28a and the gear 30a. By the rotation of the female helicoid 30, the first lens barrel 7 is moved straight along the optical axis while its rotation is inhibited by the guide 21c of the focus base member 21, thereby performing focusing.

To detect a zooming position of the taking lens, a pulse encoder 31 and a photointerrupter 33 are provided for monitoring a movement amount of the first lens frame 7. The encoder 31 is incorporated in the focus base member 21 and has a rotary disk 32 at the rear end of its gear axis 31a and an encoder gear 31b at the tip of the gear axis 31a. The rotary disk 32 has a number of slits 32a along its circumference. The encoder gear 31b engages with the outer diameter gear 30a of the female helicoid 30 through a different member from the speed reduction system.

In the two-phase photointerrupter 33, one light projecting device (not shown) and two light receiving devices (not shown) are arranged to be opposite to each other with the rotary disk 32 of the encoder 31 between. By the rotation of the rotary disk 32, light from the light projecting device is intermittently incident on a light receiving portion through the slits 32a, and the incident light is photoelectrically converted by the light receiving portion.

As well known, in such a two-phase photointerrupter 33, since for one pulse encoder 31 and one light projecting device, two light receiving devices are arranged so that the phase of the output signal of one device is delayed from that of the other, the timing of light incidence on the light receiving devices do not coincide with each other, i.e. a predetermined phase difference is generated between the output pulses. The difference in phase enables the sensing of the direction of rotation (the direction of focusing driving) and chattering.

In this arrangement, the female helicoid 30 is rotated in either direction by the rotation of the AF motor 28. The rotation of the helicoid 30 is transmitted to the encoder gear 31b to rotate the rotary disk 32. The rotation of the disk 32 is picked up and monitored by the two-phase photointerrupter 33. In this case, since the encoder gear 31a of the pulse encoder 31 directly engages with the outer gear 30a of the female helicoid 30, the sensing error components generated mainly by backlash of the speed reduction gear chain is made minimum. As a result, the control is performed highly accurately.

A conventional detecting means employing a zone focusing method also uses an encoder and a photointerrupter. In this case, however, as shown in FIG. 9B, since the encoder is provided to branch off from the focus driving gear system and since the first lens frame 7 is fastened by a ratchet mechanism after an error obtained by a calculation is corrected, the control accuracy is limited, for example, by the influence of backlash generated between the gears.

Figure 9A:
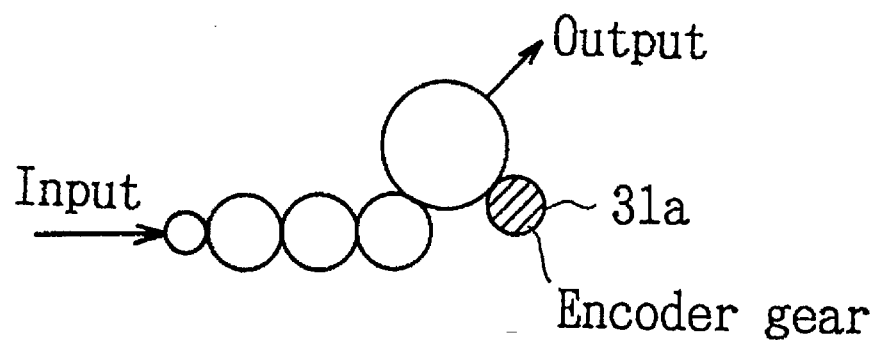
FIGS. 9A and 9B schematically show arrangements of pulse encoders.
Figure 9B:
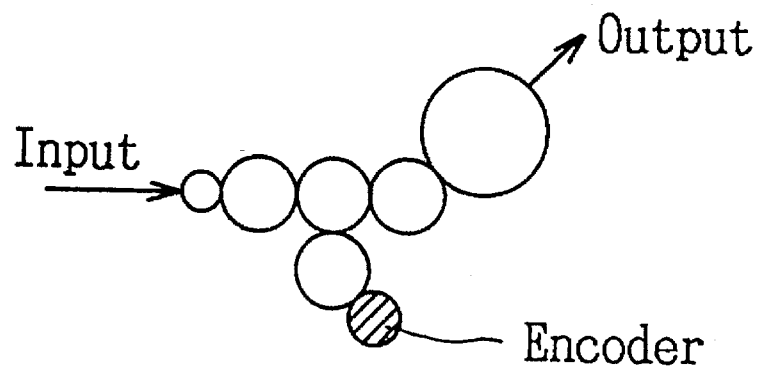

In this embodiment, as shown in FIG. 9A, the focus driver (female helicoid 30) is provided with the encoder gear 31a separately from the driving system, and the control of the moving-out mechanism for focusing is performed through a pulse control by use of the two-phase photointerrupter 33. In controlling the moving out for focusing from the nearest side to infinity with this arrangement, an extremely finely divided control (e.g. approximately 428 pulses ) is enabled.

Figure 13:
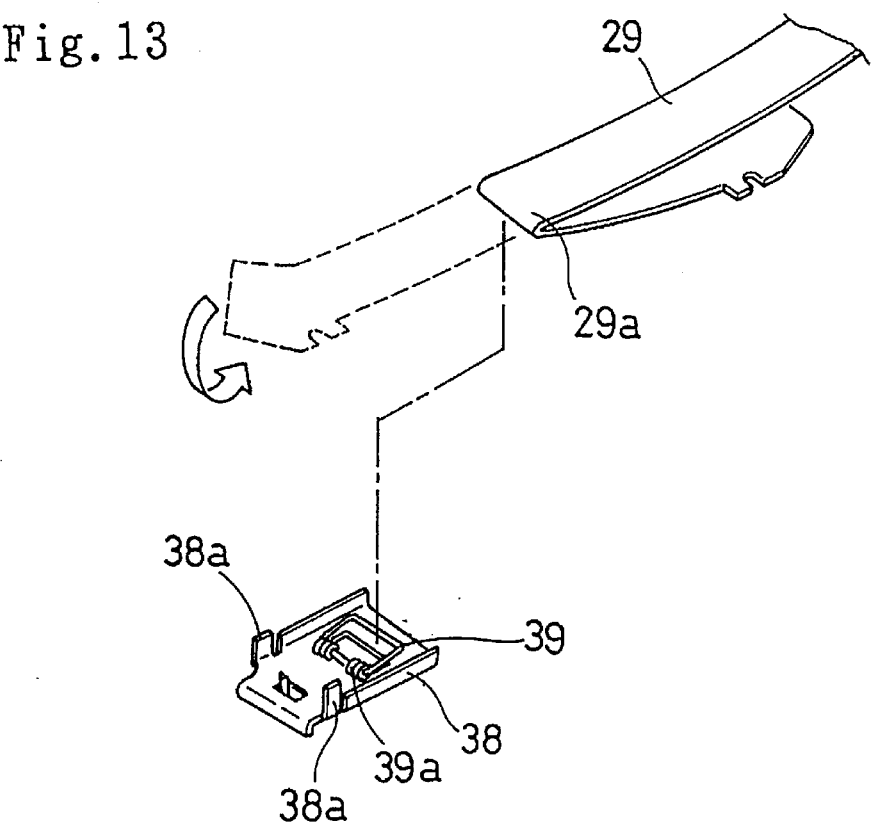
FIG. 13 is an exploded perspective view showing an arrangement for housing a flexible lead.
Figure 14:
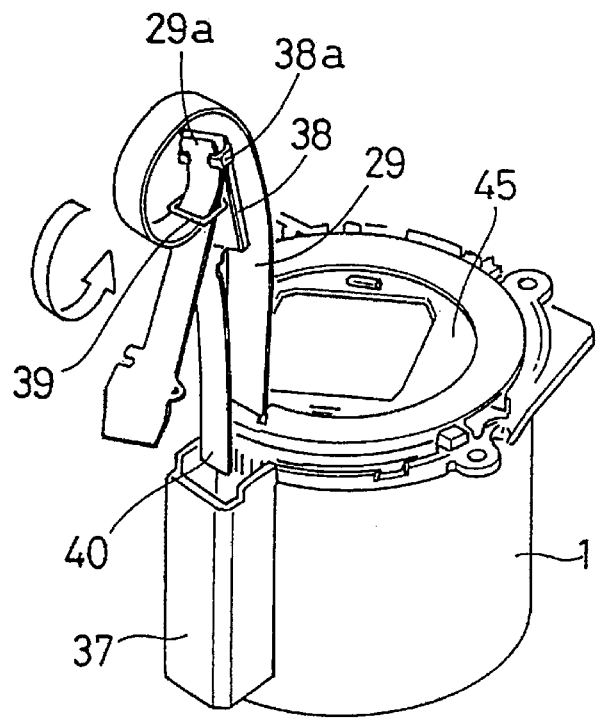
FIG. 14 is a perspective view showing a condition of the housing before the flexible lead is fixed thereto.

FIGS. 13 and 14 show an arrangement for housing the flexible lead 29 for shutter control. The shutter unit 9 is connected through the flexible lead 29 to the driving circuit provided in the camera body A.

Conventionally, the flexible lead is arranged through the lens barrel. In the conventional arrangement, since the moving-out amount of the lens from the longest to the shortest focal length conditions is small, the loose portion of the lead is housed in a space between the barrels constituting the lens barrel at a shorter focal length condition. However, in an arrangement like that of the present invention where the moving-out amount of the lens is very large and the size reduction is required, since in the barrels, there is not enough space to house the flexible lead, a new arrangement is required for arranging the flexible lead.

In this embodiment, to realize a compact lens barrel, the portion in which the flexible lead 29 is housed is provided outside the lens barrel. After drawn from the vicinity of the inner surface of the barrel 6, as shown in FIGS. 3 and 5, the flexible lead 29 passes through a guide hole 34a and a guide stay 35 provided at a reinforcing ring 34 of the lead barrel 3 and a guide hole 36 at the front of the barrel 5, and is curved into the stationary barrel 1 so that its middle portion is held by a flexible lead housing 37 of square pillar form. After drawn from the flexible lead housing 37, the flexible lead 29 is connected to the driving circuit.

Referring to FIG. 13, reference numeral 38 represents a clip board. In the center of the clip board 38, a U-shaped flexible lead pushing means 39 is provided which is pushed toward the surface of the board 38 by a coil spring 39a.

A portion of the flexible lead 29 which is housed in the flexible lead housing 37 is bent. The bent portion 29a is arranged on the clip board 38 while being put through the flexible lead pushing means 39, and its end is held by bending a holding member 38a provided at the other end of the clip board 38. Thereby, a pushing force is provided to the flexible lead 29 by the working of the spring of the flexible pushing means 39 to loosen the lead 29 in the lens barrel.

Thus, the clip board attached to the bent portion 29a of the flexible lead 29 is housed in the flexible lead housing 37 together with a clip bending member 40. Under this housing condition, the clip board 38 and the bent portion 29a of the flexible lead 29 are prevented from falling off in the flexible lead housing 37 by the clip bending member 40. When the zoom lens mechanism is collapsed, as shown in FIG. 7, the flexible lead 29 is housed in a dead space C between the cylindrical stationary barrel 1 and the camera body A while being curved by receiving the pushing force from the flexible lead pushing member 39 without being loosened.

In this arrangement, since the flexible lead 29 is pushed by a spring, it is smoothly housed in the dead space C without being loosened. Since the flexible lead 29 is pushed in the dead space C in accordance with zooming, no driving source specifically for housing the lead 29 in the space C is required. Since the intermediate guide members for the flexible lead 29 are provided at the reinforcing ring 34 and the barrel 5, the flexible lead 29 is surely prevented from intruding into the effective optical path by being loosened in the lens barrel.

Referring to FIG. 16 and 17, there are shown the bottomed cams formed on the inner surface of the zoom cam ring 4. FIG. 16 is a sectional view, and FIG. 17 is a development view. In a conventional arrangement, the cams of the zoom cam ring are formed to perforate the side wall of the cam ring. In this embodiment, however, to reduce the size, the first and second cams 4a and 4b are bottomed cam grooves formed not to perforate the zoom cam ring 4 from the inner diameter portion along the thickness. With this structure, the strength of the zoom cam ring 4 is greater than in the conventional arrangement where the cam holes are formed.

A total of six cams are formed consisting of three first cams 4a and three second cams 4b alternately arranged at equal spaces along the circumference. The cone angles of the cam grooves are 70°. On the inner surface of the zoom cam ring 4, a parting line of the metallic mold is formed at the time of molding. The accuracy is improved by controlling the operation of the zoom cam ring 4 so that the first unit guiding pins 13 and the second unit guiding pins 14 are not caught by the parting line.

The first cams 4a and the second cams 4b are formed to include a zooming cam portion and a collapsing cam portion integrated with each other. Specifically, the collapsing cam portion is formed on an extension of the zooming cam portion. With this structure, the same driving system is used for driving at the time of zoom moving out and for driving at the time of collapse. By the combination with the lens barrel consisting of three barrel units, the distance between the first and second lens units 7a and 7b and the distance between the second lens unit 8a and the film surface are minimum when the zoom mechanism is collapsed, thereby realizing compactness.

Figure 11:
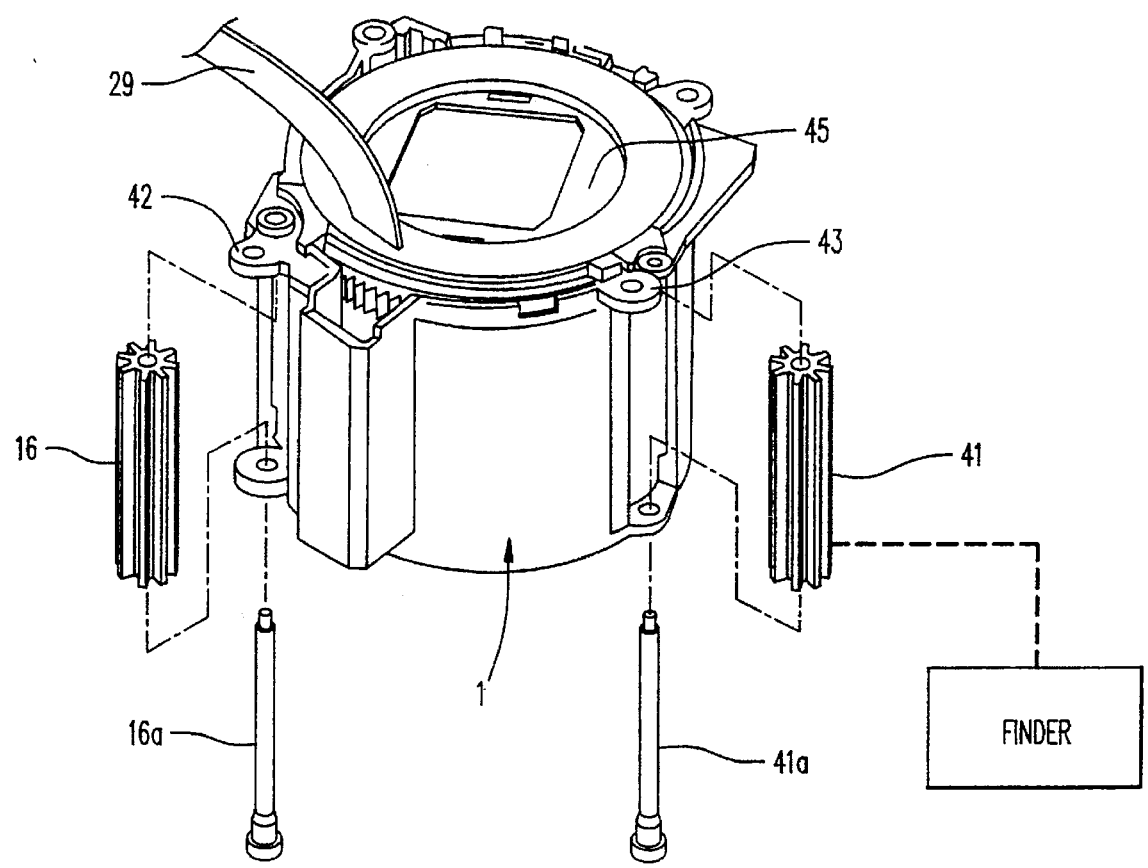
FIG. 11 is an exploded perspective view showing a zoom driving gear and a finder driving gear.

Referring to FIG. 11, there is shown an attachment of the zoom driving gear 16 and a finder driving gear 41 to the stationary barrel 1. As well known, a zoom finder (not shown) is incorporated in a zoom camera since it is necessary to vary the field of the finder in accordance with the zooming of the lens. In this embodiment, a long gear like the zoom driving gear 16 is used as the finder driving gear 41 linked with a lens driving system of the finder. The finder driving gear 41 is held by the periphery of the stationary barrel 1.

In these gear driving systems, when the driving gear 15 of the zoom driving ring 2 which is an input side gear is the long gear, the gear section becomes visible from the outside when the zoom lens mechanism is moved out. For this reason, a long gear having a thick tooth is used as the zoom driving gear 16 which is an output side gear engaging with the driving gear 15, and a gear having a thin tooth is used as the driving gear 15. The finder driving gear 41 has the same problem.

The zoom driving gear 16 and the finder driving gear 41 which are output side gears are fixed along the optical axis to move the input side gear. When the input gear is moved, the teeth thereof slip on the teeth of the output side gears while always engaging therewith. Thus, the driving torque is transmitted.

Specifically, bearings 42 and 43 are provided on the periphery of the stationary barrel 1 along the circumference at positions of different phases. At the bearings 42 and 43, the zoom driving gear 16 and the finder driving gear 41 are arranged on the same axes, and gear axes 16a and 41a are inserted therethrough to attach the zoom driving gear 16 and the finder driving gear 41 to the stationary barrel 1.

Figure 12:
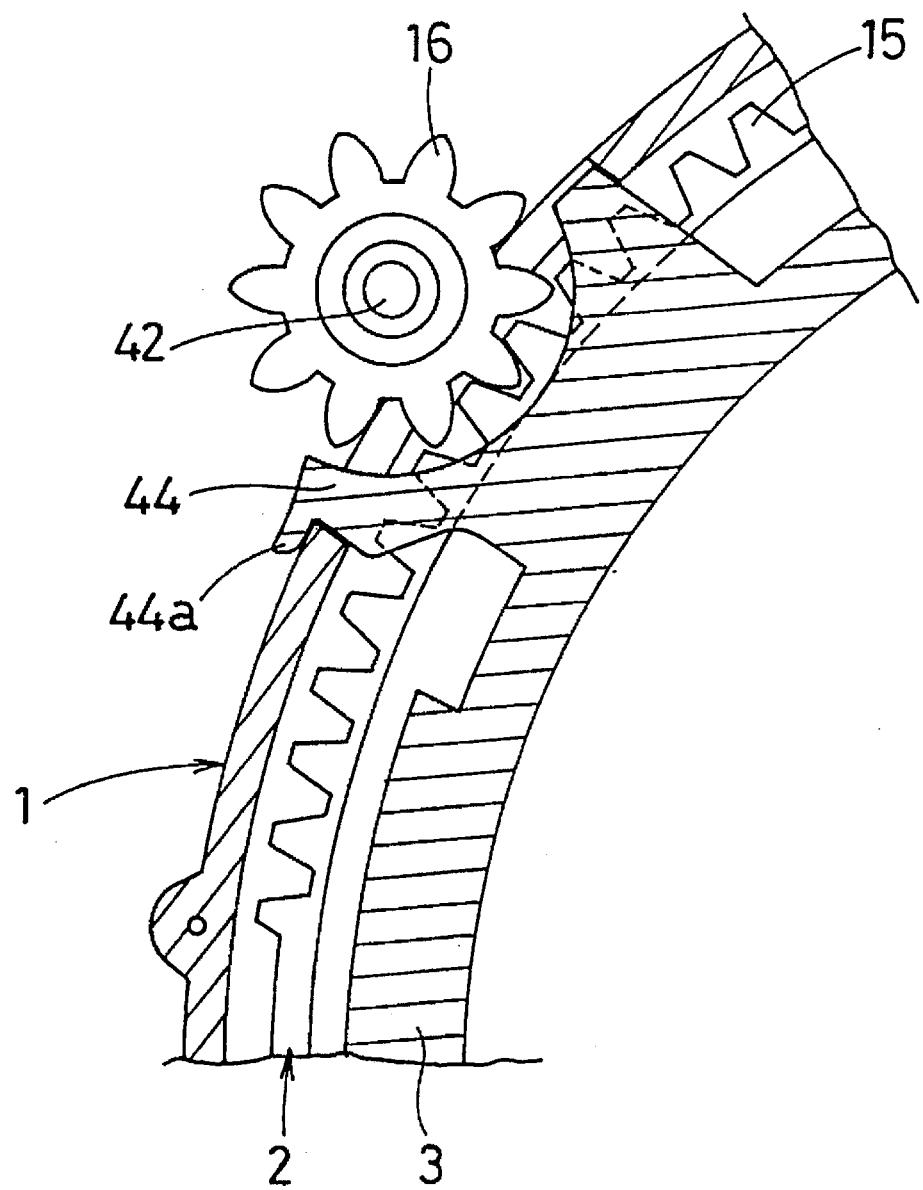
FIG. 12 is a cross-sectional view showing a zoom decentering preventing mechanism.

Referring to FIG. 12, there is shown a zoom decentering preventing mechanism. When the lens barrel is moved out for zooming by a gear transmission mechanism constituted by the driving gear 15 of the zoom driving ring 2 and the zoom driving gear 16, the pressure from the zoom driving gear 16 is applied along the normal of the pressure angle of the driving gear 15, so that the lens barrel is pushed in a direction such that the gears 15 and 16 are disengaged. Specifically, the zoom driving ring 2 is decentered relative to the stationary barrel 1 to increase the distance between the axes of the gears 15 and 16, so that the teeth of the gears 15 and 16 may not correctly engage with each other in the zoom mechanism to cause zoom swing.

To prevent this, in this embodiment, an arm member 44 is formed to protrude from the periphery of the lead barrel 3 which is located opposite to the zoom driving gear 16, and a hook 44a formed at an end of the arm member 44 is engaged with an opening 1b of the stationary barrel 1 while the arm member 44 is inserted in the opening 1b, thereby maintaining the positional relationship between the stationary barrel 1 and the zoom driving ring 2 constant against the pressure from the zoom driving gear 16.

Figure 18:
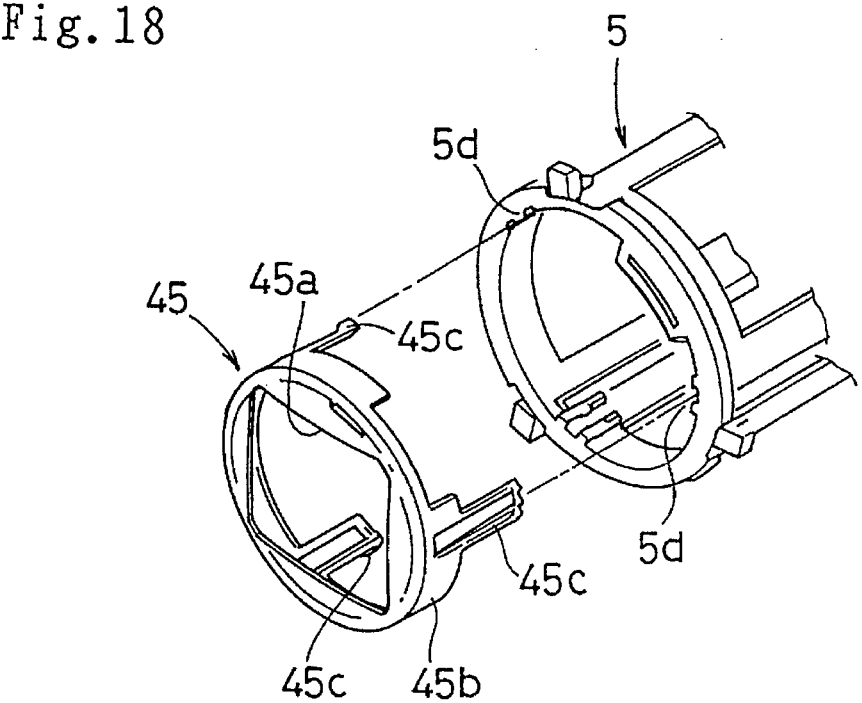
FIG. 18 is an exploded perspective view showing a flare cutter.

Referring to FIG. 18, there is shown a flare cutter 45. The flare cutter 45 includes a frame 45b having an angular window 45a, and an engagement arm 45c protruding from the periphery of the frame 45b. The flare cutter 45 is attached to the front aperture of the barrel 5 by engaging the engagement arm 45c with an engagement member 5d.

In this embodiment, since the flare cutter 45 is formed by plastic molding, it can be brought into close contact with the lens to achieve a highly effective flare preventing configuration, and the portion which is fixed to the lens barrel, i.e. the engagement arm 45c can be formed integrally with the frame 45b.

Figure 19:
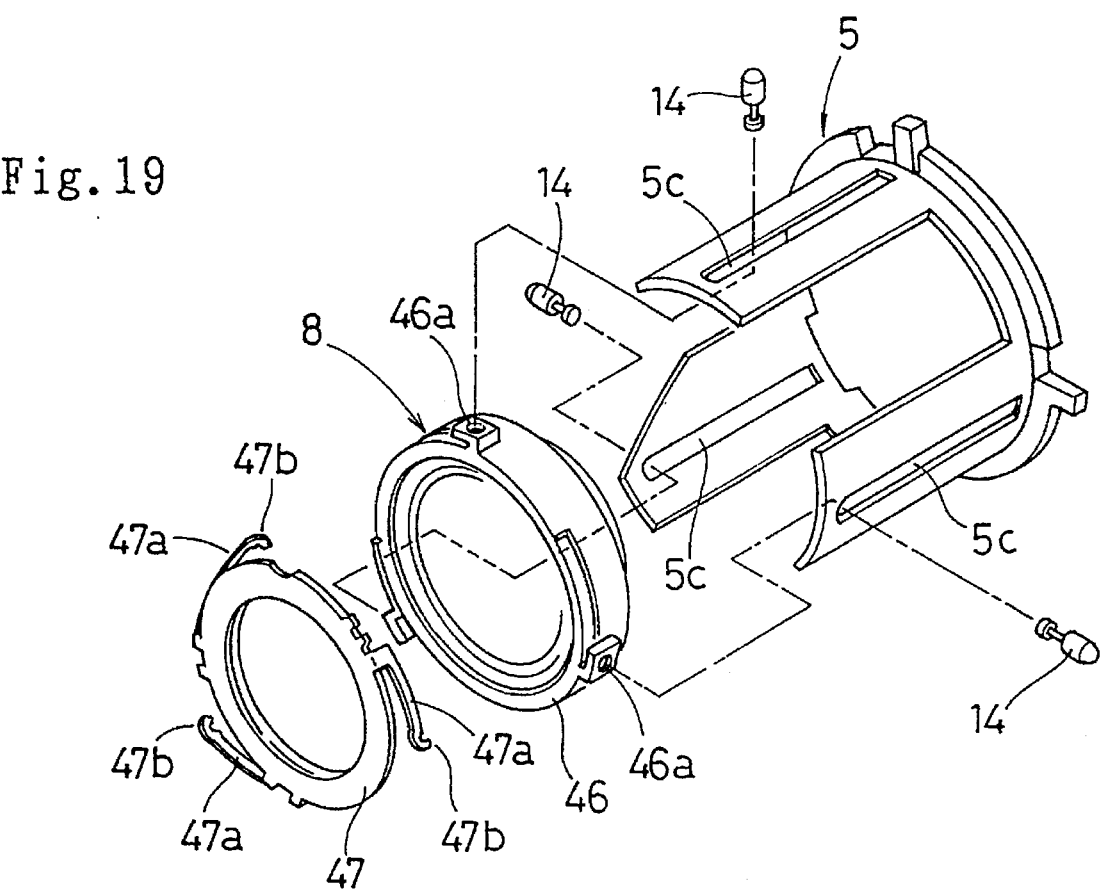
FIG. 19 is an exploded perspective view showing a second lens frame pushing mechanism.

Referring to FIG. 19, there is shown an arrangement for pushing the second lens frame 8. The second lens frame 8 includes a frame member 46 for holding the second lens unit 8a, and a light intercepting plate 47. At the periphery of the frame member 46, three pin holes 46a for admitting the second unit-guiding pins 14 are formed in a radial direction at positions to divide the circumference into three equal zones. At the light intercepting plate 47, three plate springs 47a are formed to extend along the circumference or the tangential line at positions to divide the circumference into three equal parts.

The light intercepting plate 47 engages with the frame member 46 while the working ends of the plate springs 47a correspond to the pin holes 46a. The frame member 46 to which the light intercepting plate 47 is attached is inserted into the barrel 5 so that the pin holes 46a correspond to the holes 5c, and the second unit guiding pins 14 are inserted through the holes 5c into the pin holes 46a, thereby the second lens frame 8 is attached to the barrel 5.

The second unit guiding pins 14 are taper, and each has a caught portion 14a at its base end. When the second unit guiding pins 14 are inserted in the pin holes 46a, the caught portions 14a are caught by U-shaped grooves 47b of the plate springs 47a. With this arrangement, the second unit guiding pins 14 are pressed against the second cams 4b formed on the inner surface of the zoom cam ring 4 while being pushed outside along the diameter by the plate springs 47a, and since the second unit guiding pins 14 which are taper exert centripetal force while moving, the generation of backlash is effectively prevented. As a result, the positional accuracy of the lens improves.

Since the plate spring 47a is formed integrally with the light intercepting plate 47 by press molding, the manufacturing cost is reduced. By using as the first unit guiding pin 13 a taper pin having a slanting end like the second unit guiding pin 14, the first and second cams 4a and 4b of the zoom cam ring 4 and the guiding pins 11, 13 and 14 are provided with centripetal force.

Figure 20:
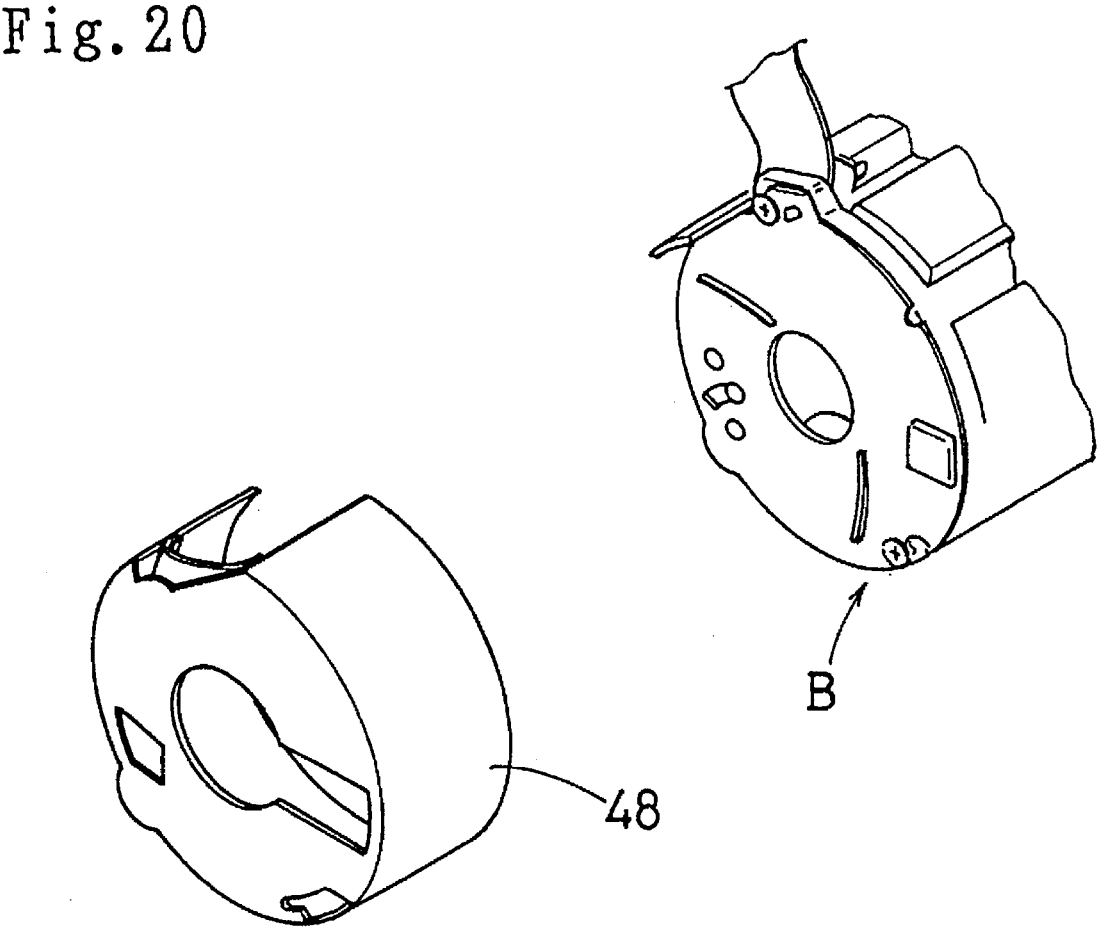
FIG. 20 is an exploded perspective view showing a light intercepting cover.

Referring to FIG. 20, there is shown a light intercepting arrangement of the focus shutter block B. Since there are a number of minute gaps in the focus shutter block B having a complicated structure as shown in FIGS. 10A and 10B, it is very difficult to obtain an effective light intercepting capability by intercepting light by using a light intercepting tape for every necessary portion. For this reason, in this embodiment, the focus shutter block B is completely light-intercepted by covering it with a light intercepting cover 48 made of a metal. The light intercepting cover 48 is formed, for example, by deep drawing molding and black matte finish processing of an aluminum plate with a thickness of 0.3 to 0.2 mm.

As described above, according to the zoom lens mechanism of the present embodiment provided with a first lens unit, a second lens unit, a stationary barrel fixed in the camera body, a first movable barrel attached in the stationary barrel to be movable out, a second movable barrel attached in the first movable barrel to be movable out and a third movable barrel attached in the second movable barrel to be movable out wherein the first lens unit is held in the third movable barrel to be movable and the second lens unit is held in the first or second movable barrel to be movable, even if the length of each of the movable barrels is set so that all of the three movable barrels are housed in the stationary barrel, the total moving-out amount of the three movable barrels is remarkably large compared to conventional arrangements. As a result, a high zoom ratio is obtained.

Further, when a collapsible structure is employed, the necessary thickness of the camera is much smaller. As a result, a zoom lens mechanism is realized which has a high zoom ratio but is very compact and can be incorporated in a lens shutter camera.

By reducing the number of lens elements, the size of the camera along the optical axis is reduced by arranging the lenses to be close to each other, and the three movable barrels are nested. As a result, the zoom lens mechanism which is thin when collapsed is realized.

While in the above-described embodiment, the present invention is employed in a so-called lens shutter camera, i.e. a camera where the shutter is provided in the lens barrel, the present invention is not limited to a specific shutter type; the present invention may be employed in a camera provided with a focal plane shutter.

Obviously, many modifications and variations of the present invention are possible in light of the above teachings. It is therefore to be understood that within the scope of the appended claims, the invention may be practiced other than as specifically described.

What is claimed is:

1. A lens mechanism comprising:

a stationary barrel fixed to a camera;

a first movable barrel fitted inside the stationary barrel to be movable out from the stationary barrel;

a second movable barrel fitted inside the first movable barrel to be movable out from the first movable barrel;

a third movable barrel fitted inside the second movable barrel to be movable out from the second movable barrel;

a first lens unit held in the third movable barrel;

a second lens unit held in the second movable barrel to be movable therein; and a driving mechanism for moving said second movable barrel out from said first movable barrel and for moving said third movable barrel out from said second barrel at the same time as said first movable barrel is moved out from said stationary barrel, wherein said driving mechanism drives said first lens unit together with said third movable barrel and drives said second lens unit through the inside of said second movable barrel as said second movable barrel is moved out from said first movable barrel.

2. A lens mechanism as claimed in claim 1, wherein a light intercepting member formed by compression molding is provided in each of a gap between the stationary barrel and the first movable barrel, a gap between the first and second movable barrels and a gap between the second and third movable barrels.

3. A lens mechanism as claimed in claim 2, wherein said light intercepting member is made of a silicone rubber material.

4. A lens mechanism as claimed in claim 2, wherein said light intercepting member is made of a material to which a fluorine coating is applied.

5. A lens mechanism as claimed in claim 1, wherein said second movable barrel comprises two barrels, which are moved out together in an optical direction, and wherein rotational movement between said two barrels drives the first and the second lens units.

6. A lens mechanism comprising:

a stationary barrel fixed to a camera;

a movable barrel held in the stationary barrel to be movable in the stationary barrel;

a gear portion formed on a periphery of the movable barrel;

a gear member driven in engagement with the gear portion to move the movable barrel;

an arm formed on the exterior of the movable barrel to extend along a radius of the movable barrel; and a hook formed at a tip of the arm, said hook non-releasably engaging the stationary barrel to prevent the stationary barrel and the movable barrel from being detached from each other in the radial direction by a force generated by the driving of the gear portion by the gear member.

7. A lens barrel comprising:

a driving gear; and a driven gear formed to be longer along an optical axis than the driving gear, said driven gear being driven by being engaged with the driving gear;

wherein said driving gear moves along the optical axis while rotating, and a tooth of the driving gear and a tooth of the driven gear slip on each other along the optical axis to transmit a driving force.

8. A lens barrel as claimed in claim 7, wherein said driven gear is a gear for driving a finder.

9. A zoom lens apparatus, comprising:

a plurality of movable lens units;

a stationary barrel disposed at a stationary position inside a body of a camera;

a first movable barrel having a first cam groove, said first movable barrel being disposed inside said stationary barrel and being movable out from said stationary barrel;

a second movable barrel having a second cam groove, and being movable together with said first movable barrel in an optical direction;

a third movable barrel having a second cam groove and being movable together with said first movable barrel in an optical direction;

a third movable barrel having a third cam groove, said third movable barrel being disposed inside said first movable barrel and being movable out from said first movable barrel by means of a first cam mechanism comprising said first cam groove and said second cam groove;

a fourth movable barrel having a cam member and being movable together with said third movable barrel in an optical direction; and a fifth movable barrel disposed inside said third movable barrel and being movable out from said third movable barrel by means of a second cam mechanism comprising said third cam groove and said cam member.

10. A zoom lens apparatus as claimed in claim 9, wherein said fifth movable barrel is disposed inside said third movable barrel and outside said fourth movable barrel.

11. A zoom lens apparatus as claimed in claim 9, wherein said fifth movable barrel holds one of said plurality of movable lens units, and wherein said third movable barrel has a fourth cam groove and said fourth movable barrel has a fifth cam groove which comprise a third cam mechanism for holding another of said plurality of movable lens units.

12. A zoom lens apparatus as claimed in claim 9, wherein a light intercepting member formed by compression molding is provided in each of a gap between the stationary barrel and the first movable barrel, a gap between the first and third movable barrels and a gap between the third and fifth movable barrels.

13. A zoom lens apparatus as claimed in claim 12, wherein said light intercepting member is made of a silicone rubber material.

14. A zoom lens apparatus as claimed in claim 12, wherein said light intercepting member is made of a material to which a fluorine coating is applied.

* * * * *